(12) United States Patent
Gates et al.

(10) Patent No.: US 10,156,194 B2
(45) Date of Patent: Dec. 18, 2018

(54) METHODS AND SYSTEMS FOR OPEN LOOP AND CLOSED LOOP CONTROL OF AN EXHAUST GAS RECIRCULATION SYSTEM

(71) Applicant: Ford Global Technologies, LLC, Dearborn, MI (US)

(72) Inventors: Freeman Carter Gates, Bloomfield Hills, MI (US); Kirk Pulay, Belleville, MI (US); Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/964,525

(22) Filed: Apr. 27, 2018

(65) Prior Publication Data
US 2018/0245530 A1    Aug. 30, 2018

Related U.S. Application Data

(62) Division of application No. 15/703,032, filed on Sep. 13, 2017, now Pat. No. 10,024,254, which is a
(Continued)

(51) Int. Cl.
*F02P 5/00* (2006.01)
*F02D 41/00* (2006.01)
(Continued)

(52) U.S. Cl.
CPC ..... *F02D 41/0072* (2013.01); *F02D 41/0077* (2013.01); *F02D 41/144* (2013.01); *F02M 26/05* (2016.02); *F02M 26/08* (2016.02); *F02M 26/43* (2016.02); *F02M 26/47* (2016.02); *F02M 26/53* (2016.02); *F02P 5/15* (2013.01); *F02D 41/1452* (2013.01); *F02D 2041/141* (2013.01); *F02D 2041/1409* (2013.01)

(58) Field of Classification Search
CPC ...... F02P 5/00; F02P 5/04; F02P 5/045; F02P 5/14; F02P 5/1516
USPC ............ 123/406.11, 406.23, 406.24, 406.41, 123/406.44
See application file for complete search history.

(56) References Cited

U.S. PATENT DOCUMENTS 5,884,605 A    3/1999  Nagaishi et al.
6,729,301 B2   5/2004  Nakamori et al.
(Continued)

OTHER PUBLICATIONS

Mohammad, W., "Pulsating Flow Effects on Flowmeters in Pipelines," Doctor of Philosophy Thesis, University of Surrey, Department of Mechanical Engineering, Jul. 1982, 257 pages.

*Primary Examiner* — John Kwon
(74) *Attorney, Agent, or Firm* — Julia Voutyras; McCoy Russell LLP

(57) ABSTRACT

Methods and systems are provided for estimating exhaust gas recirculation (EGR) flow in an engine including an EGR system. In one example, a method may include operating the EGR system in an open loop feed forward mode based on an intake carbon di oxide sensor output above a threshold engine load and/or when a manifold absolute pressure (MAP) is above a threshold pressure, and operating the EGR system in a closed loop feedback mode based on a differential pressure sensor output when the engine load decreases below the threshold load and/or when the MAP decreases below the threshold pressure.

9 Claims, 6 Drawing Sheets

Related U.S. Application Data division of application No. 14/933,714, filed on Nov. 5, 2015, now Pat. No. 9,835,100.

(51) Int. Cl.
*F02M 26/47* (2016.01)
*F02P 5/15* (2006.01)
*F02M 26/53* (2016.01)
*F02M 26/05* (2016.01)
*F02M 26/08* (2016.01)
*F02M 26/43* (2016.01)
*F02D 41/14* (2006.01)

(56) References Cited

U.S. PATENT DOCUMENTS

| | | |
|---|---|---|
| 8,601,811 B2 | 12/2013 | Pursifull et al. |
| 9,797,323 B2 | 10/2017 | Surnilla et al. |
| 9,920,699 B1 | 3/2018 | McQuillen et al. |
| 2013/0332050 A1* | 12/2013 | Song ............ F02D 41/144 701/104 |
| 2014/0305412 A1 | 10/2014 | Ahms |
| 2014/0305413 A1 | 10/2014 | Ahms |
| 2016/0160811 A1* | 6/2016 | Deb ............ F02M 26/49 123/568.2 |
| 2016/0169186 A1* | 6/2016 | Stroh ............ F02P 5/1516 123/406.48 |
| 2016/0237924 A1* | 8/2016 | Azizou ............ F02D 41/0072 |
| 2016/0245213 A1 | 8/2016 | Surnilla et al. |
| 2017/0122191 A1 | 5/2017 | Ahms |
| 2017/0130660 A1* | 5/2017 | Gates ............ F02M 26/47 |

\* cited by examiner

METHODS AND SYSTEMS FOR OPEN LOOP AND CLOSED LOOP CONTROL OF AN EXHAUST GAS RECIRCULATION SYSTEM

CROSS REFERENCE TO RELATED APPLICATIONS

The present application is a divisional of U.S. patent application Ser. No. 15/703,032, entitled "METHODS AND SYSTEMS FOR OPEN LOOP AND CLOSED LOOP CONTROL OF AN EXHAUST GAS RECIRCULATION SYSTEM," filed on Sep. 13, 2017. U.S. patent application Ser. No. 15/703,032 is a divisional of U.S. patent application Ser. No. 14/933,714, entitled "METHODS AND SYSTEMS FOR OPEN LOOP AND CLOSED LOOP CONTROL OF AN EXHAUST GAS RECIRCULATION SYSTEM," filed on Nov. 5, 2015, now U.S. Pat. No. 9,835,100. The entire contents of the above-referenced applications are hereby incorporated by reference in their entirety for all purposes.

FIELD

The present description relates generally to methods and systems for controlling an exhaust gas recirculation system of a vehicle engine.

BACKGROUND/SUMMARY

Engine control systems employ exhaust gas recirculation (EGR) mechanisms to regulate exhaust emissions and improve fuel economy. EGR mechanisms may include an EGR system which recirculates a portion of the exhaust gas from the exhaust passage to the intake passage via an EGR passage. The EGR systems employ a delta pressure (DP) sensor across an orifice located downstream of an EGR valve in the EGR passage to provide an estimate of EGR mass flow. The estimated EGR mass flow is then utilized to determine a degree of spark advance.

However, at certain engine operating conditions, such as at high load conditions, and/or when an manifold absolute pressure (MAP) is greater than a threshold pressure, a differential pressure across the orifice is modulated due to pulsating flow of the exhaust. Therefore, the DP sensor may output a higher voltage due to the root mean square value of the exhaust pulsations. In other words, the exhaust pulsation may cause the DP sensor to output a higher voltage than actual. As a result, EGR mass flow may be estimated to be higher than actual flow during the high load conditions. Since spark advance is based on the estimated EGR mass flow, typically one degree of spark advance for each percent of EGR estimated, for example, an overestimation of EGR mass may lead to potential spark knock (due to over-advanced spark timing). As a result, it may be necessary to retard the spark timing to reduce knock, which may lead to reduced fuel economy and performance.

The inventors herein have recognized the above-mentioned issues. Accordingly, in one example, some of the above issues may be at least partially addressed by a method for an engine, comprising: estimating an exhaust gas recirculation (EGR) mass flow based on a differential pressure sensor output when an engine load is below a threshold; estimating the EGR mass flow based on an intake carbon dioxide sensor output when the engine load is above the threshold and independent of the differential pressure sensor output; and adjusting a spark timing based on the estimated EGR mass flow. In this way, more accurate EGR flow estimations may be performed across various load conditions. Consequently, more accurate spark advance may be scheduled, which reduces the chances of spark knock.

As one example, during certain engine operating conditions, such as when an engine load is above a threshold load and/or when a MAP is above a threshold pressure, the EGR system may be operated in an open loop control mode. In the open loop control mode, the EGR mass flow is estimated independent of DP sensor output but rather based on feed forward mapped intake carbon dioxide data based on engine speed and load; and a degree of spark advance is scheduled based on the EGR mass flow estimated based on intake carbon dioxide values. Further, during the open loop mode, an EGR valve is not controlled based on DP sensor output but rather maintained in a fully open position or in a nearly fully open position that is based on threshold load.

During engine operating conditions below the threshold, the EGR system may be operated in a closed loop control mode. In the closed loop control mode, the EGR mass flow is estimated based on DP sensor output, and the degree of spark advance is scheduled based on the DP sensor based EGR mass flow estimation. Further, during the closed loop control mode, the EGR valve is controlled based on DP sensor output. For example, the EGR valve is adjusted based on an error between an actual DP sensor output and a desired DP sensor output.

In this way, by switching between open loop and closed loop control of the EGR system, more accurate EGR flow estimations may be performed. Consequently, more accurate spark advance may be scheduled, which may lead to reduced spark knock. As a result, unwarranted spark retard may be reduced, resulting in improved fuel economy and performance. Thus, by utilizing open loop control and closed loop control of the EGR system based on load and intake manifold pressure, the technical effect of more accurate EGR flow estimation, more accurate spark advance, and reduced spark knock may be achieved, and hence fuel economy may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for open loop and closed loop control of an EGR system in an engine system (such as engine system of FIG. 1) based on load and/or intake manifold pressure for improving EGR mass flow estimation in regions of high exhaust pulsations. Specifically, as shown at FIG. 2, the EGR system may be operated in a closed loop feedback mode at engine operating conditions below a threshold load, and when the engine is operating at loads above the threshold load, the EGR system may be operated in an open loop feed forward mode. In some examples, additionally or alternatively, the EGR system may be operated in the closed loop feedback mode when a manifold absolute pressure (MAP) is below a threshold pressure, and when the MAP is above the threshold pressure, the EGR system may be operated in the closed loop feed-forward mode. An example of the open loop feed forward mode and the closed loop feedback mode is illustrated in a block diagram at FIG. 3. A controller, such as the controller of FIG. 1, may be configured to perform a control routine, such as the example routine of FIG. 4 for switching EGR system operation between open loop and closed loop modes, and the example routine of FIG. 5 for operating the EGR system in the closed loop mode. An example open and closed loop control of the EGR system according to the present disclosure is shown at FIG. 6.

Figure 1:
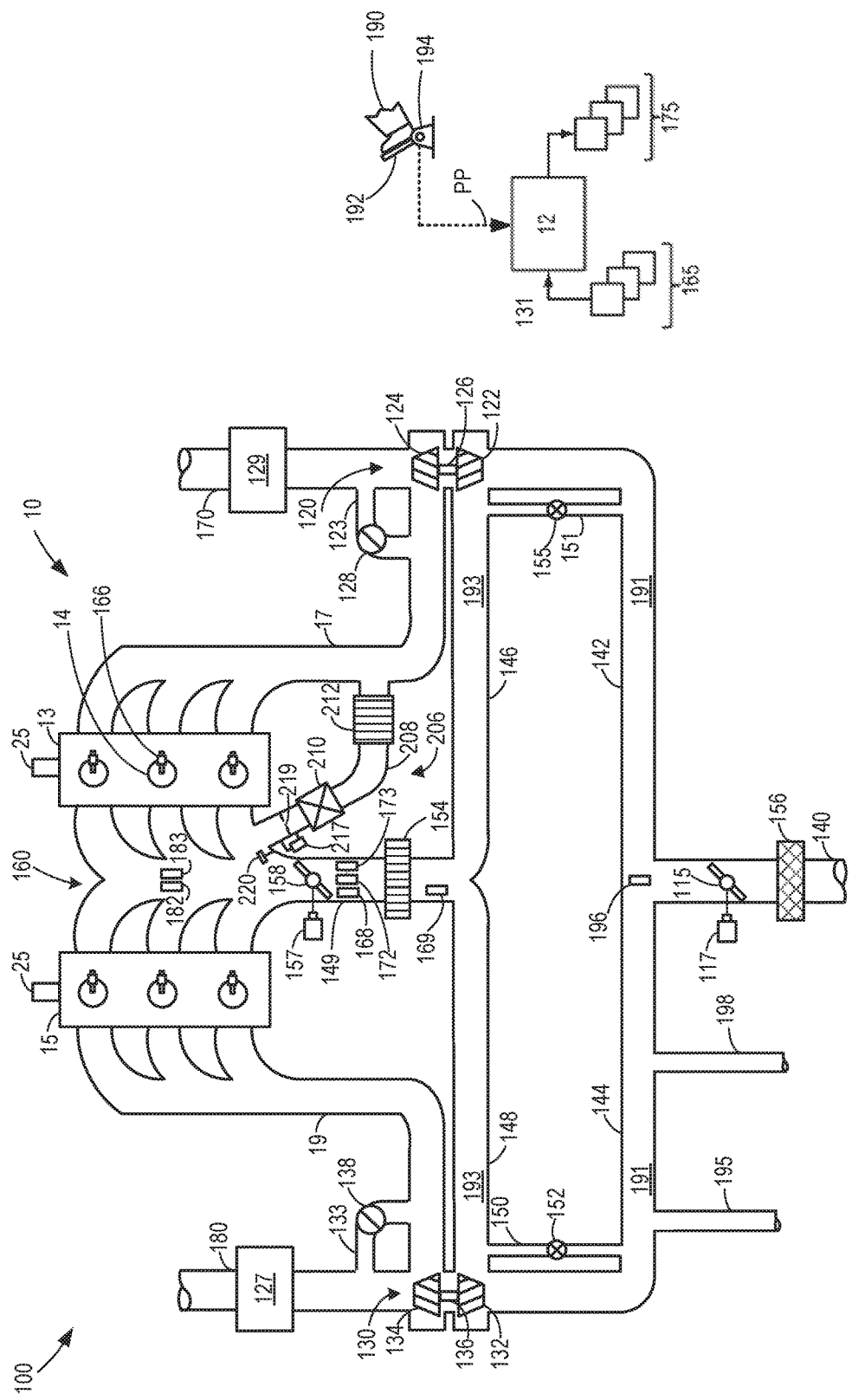
FIG. 1 shows a schematic diagram of a twin-turbocharged engine system, including a high pressure EGR system.
Figure 2:
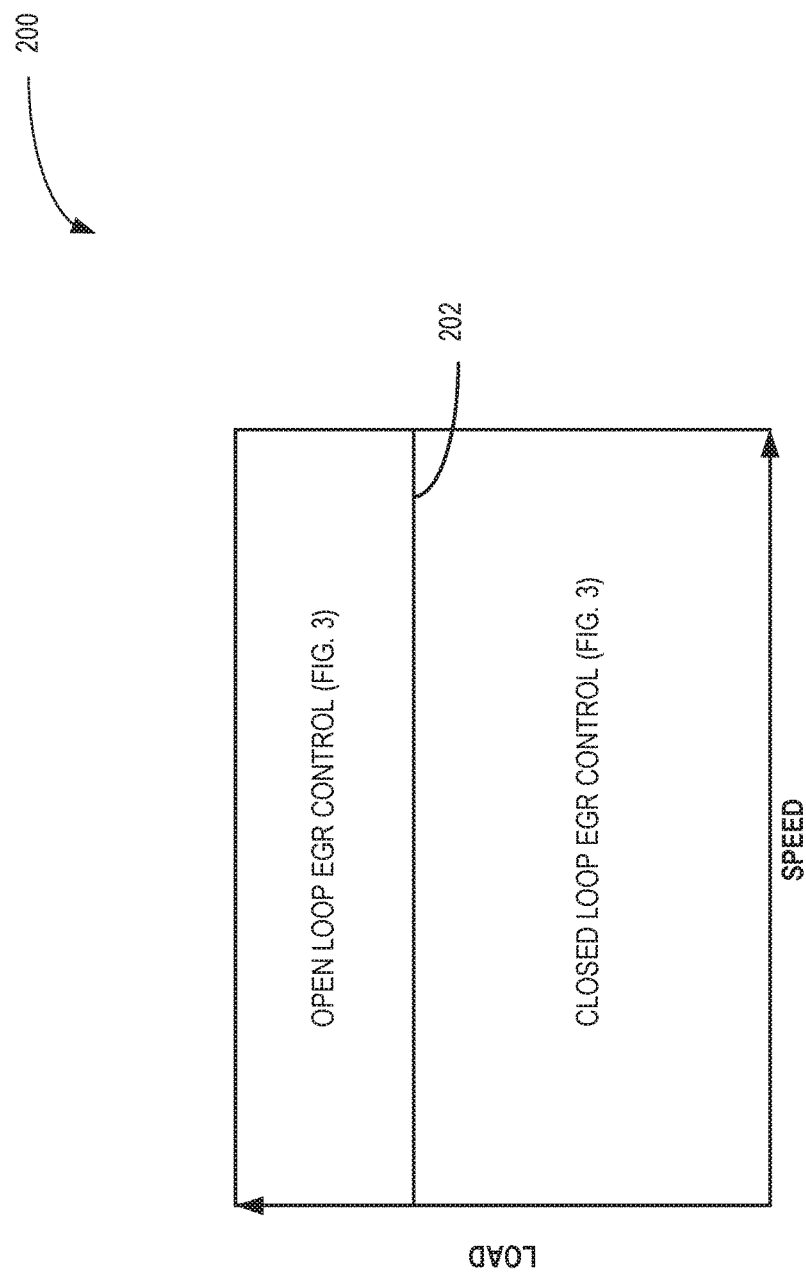
FIG. 2 shows an example speed-load map depicting open and closed loop EGR control modes.

Turning to FIG. 1, it shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger, or an engine without a turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. In other words, the controller 12 receives signals from the various sensors of FIG. 1, including DP sensor 217, intake carbon dioxide sensor 220, manifold air pressure (MAP) sensor 182, and intake oxygen sensor 168, and employs the various actuators of FIG. 1, such as a motor actuator for high pressure EGR valve 210, spark timing, etc., to adjust engine operation based on the received signals and instructions stored on a memory of the controller. Example control routines are described herein with regard to FIGS. 3-5.

Engine system 100 may receive intake air via intake passage 140. As shown at FIG. 1, intake passage 140 may include an air filter 156 and an air induction system (AIS) throttle 115. The position of AIS throttle 115 may be adjusted by the control system via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system (LP AIS) 191 upstream of compressors 122 and 132, and a high pressure AIS system (HP AIS) 193 downstream of compressors 122 and 132.

A positive crankcase ventilation (PCV) conduit 198 may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 195 coupling the fuel vapor canister to the second branch 144 of the intake passage.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes an air cooler 154 and a throttle 158. The position of throttle 158 may be adjusted by the control system via a throttle actuator 157 communicatively coupled to controller 12. As shown, throttle 158 may be arranged in intake passage 149 downstream of air cooler 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 144 upstream of compressor 132, and a downstream end of CBV passage 150 may be coupled with intake passage 148 downstream of compressor 132. Similarly, an upstream end of a CBV passage 151 may be coupled with intake passage 142 upstream of compressor 122, and a downstream end of CBV passage 151 may be coupled with intake passage 146 downstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a compressor inlet pressure (CIP) sensor 196 is arranged in the intake passage 142. and an HP AIS pressure sensor 169 is arranged in intake passage 149. However, in other anticipated embodiments, sensors 196 and 169 may be arranged at other locations within the LP AIS and HP AIS, respectively.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via pneumatic actuator controlled by a solenoid valve. For example, the solenoid valve may receive a signal for facilitating the actuation of wastegate 128 via the pneumatic actuator based on the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve controlling a pneumatic actuator. For example, the solenoid valve may receive a signal for facilitating the actuation of wastegate 138 via the pneumatic actuator based on the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators. Products of combustion exhausted by the cylinders via exhaust passage 19 may be directed to the atmosphere via exhaust passage 180 downstream of turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_X$ traps, various other emission control devices, or combinations thereof. Further, in some embodiments, during operation of the engine 10, emission control devices 127 and 129 may be periodically regenerated by operating at least one cylinder of the engine within a particular air/fuel ratio, for example.

Engine system 100 may further include one or more exhaust gas recirculation (EGR) systems for recirculating at least a portion of exhaust gas from the exhaust manifold to the intake manifold. These may include one or more high pressure EGR systems for proving high pressure EGR (HP EGR) and one or more low-pressure EGR-loops (not shown) for providing low pressure EGR (LP EGR).

In the depicted example, the engine system 100 may include a HP EGR system 206. In the depicted example, engine system 100 may be equipped with HP EGR system on only one bank of the V engine. HP EGR system 206 routes a desired portion of exhaust gas from common exhaust passage 17, upstream of the turbine 124, to intake manifold 160, downstream of intake throttle 158. Alternatively, the HP EGR system 206 may be positioned between exhaust passage 17 and the intake passage 193, downstream of the compressor 122. The amount of HP EGR provided to intake manifold 160 may be varied by the controller 12 via EGR valve 210 coupled in the HP EGR passage 208. For example, controller 12 may adjust a position of EGR valve 210 by sending a control signal (e.g., an electrical signal such as voltage or current) to an actuator of the EGR valve, such as a motor, which may be a dc motor, to provide a desired amount of HP EGR. In the example embodiment shown at FIG. 1, HP EGR system 206 includes an EGR cooler 212 positioned upstream of EGR valve 210. EGR cooler 212 may reject heat from the recirculated exhaust gas to engine coolant, for example.

Further, a differential pressure (DP) sensor 217 may be arranged within the EGR passage. DP sensor 217 may provide an indication of one or more of pressure, temperature, and concentration of the exhaust gas. In one example, output from DP sensor 217 may be utilized with output from MAP sensor 182 to estimate an EGR mass flow. For example, DP sensor 217 may detect a pressure drop across an EGR flow control orifice 219 placed downstream of EGR valve 210, which when combined with MAP, can provide an indication of the amount of EGR. As such, DP sensor 217 may provide a differential pressure signal DP across the EGR orifice to the controller 12. In some examples, sensor 217 may comprise a manifold absolute pressure (MAP) sensing element and a differential pressure (DP) sensing element, as well as a manifold temperature sensing element. In some examples, the flow control orifice 219 may be placed upstream of EGR valve 210, or downstream of EGR valve 210 as shown. In some examples, an additional sensor may sense EGR valve position to indicate EGR valve flow area changes based upon commands from controller 12 and thus provide feedback control for valve position control.

Engine system 100 may also include a second high pressure EGR loop (not shown) for recirculating at least some exhaust gas from the exhaust passage 19, upstream of the turbine 134, to the intake passage 148, downstream of the compressor 132, or to the intake manifold 160, downstream of intake throttle 158. EGR flow through HP EGR loop 208 may be controlled via HP EGR valve 210.

EGR valve 210 may be configured to adjust an amount and/or rate of exhaust gas diverted through the corresponding EGR passages to achieve a desired EGR dilution percentage of the intake charge entering the engine. As a specific example, during engine operation at lower load conditions below a threshold load, EGR valve 210 may be controlled based on a closed-loop feedback mechanism to achieve a desired EGR mass flow. For example, when the engine load is below the threshold, output from DP sensor 217 may be utilized to estimate an actual EGR mass flow (that is, EGR mass flow at a given time). Based on engine operating conditions (e.g., engine speed and engine load), a desired EGR mass flow may be determined. The engine controller may then determine an error between the actual and the desired EGR mass flow, and adjust EGR valve 210 based on the error. Further, based on the actual EGR mass flow determined based on the DP sensor output, a degree of spark advance may be scheduled. In some examples, an error between an actual (or measured) DP sensor output and a desired DP sensor output may be utilized by the controller to adjust EGR valve 210.

In this way, when operating at loads below the threshold load, feedback from the DP sensor may be utilized to control the EGR valve to provide desired EGR mass flow. In other words, during engine operation below the threshold load, the EGR system is operated in a closed loop mode with feedback from DP sensor.

However, when operating at higher loads above the threshold load, pulsating exhaust flow may cause the DP sensor to indicate a higher EGR mass flow than the actual EGR mass flow. For example, due to the root mean square values of the exhaust pulsations, the DP sensor may output a higher voltage than actual voltage. Consequently, the DP sensor may indicate a higher EGR mass flow than actual. Therefore, in order to improve accuracy of EGR flow estimation, when the engine is operating at higher loads above the threshold, the actual EGR mass flow at a given time may be determined independent of the DP sensor output but rather inferred from an output of an intake carbon di oxide sensor 220. For example, a map correlating intake carbon dioxide levels with EGR percentage at various speed and load conditions may be stored within a memory of the controller. Then, based on the intake carbon dioxide concentration measured by the intake carbon di oxide sensor and engine air flow measured by a MAF sensor, the EGR mass flow may be determined. Then, the degree of spark advance is determined based on the EGR flow estimated based on the intake carbon di oxide sensor.

Further, during engine operation at loads above the threshold, due to exhaust pulsation corrupting DP sensor output as discussed above, the engine controller may not adjust the EGR valve based on DP sensor output but rather an open loop control mechanism of the EGR system may be employed. That is, the EGR valve may be maintained at an open loop position when the engine is operating above the threshold load and the actual EGR mass flow is estimated based on the intake carbon di oxide sensor. In one example, the open loop position may be a fully open position of EGR valve 210. In another example, the open loop position may be based on the threshold load. For example, at the threshold load, the controller may adjust the EGR valve at a threshold load position to provide a desired EGR flow. Then, as long as the load remains at or above the threshold load, the EGR valve may be maintained at the threshold load position, and the actual EGR mass flow may be estimated based on the mapped intake carbon dioxide values.

In some examples, the threshold load may be based on a fully open position of EGR valve 210. In such cases, the threshold load position may be the fully open position. In some examples, the threshold load position may be a nearly fully open position.

In the depicted example, the intake carbon di oxide sensor is positioned at a junction of intake passage 149 and HP EGR passage 208. However, in other embodiments, the intake carbon dioxide sensor may be positioned within intake passage 149 downstream of throttle 158. The intake carbon dioxide sensor may be any suitable sensor for providing an indication of carbon dioxide concentration in the intake charge.

In this way, when operating at loads at or above the threshold, feedback from the DP sensor may not be utilized to control the EGR valve; rather the EGR valve may be maintained at a specific position corresponding to the threshold load or the EGR valve may be fully opened, and the EGR flow estimation for scheduling spark may be based on mapped intake carbon dioxide values. In other words, during engine operation below the threshold load, the EGR system is operated in an open loop mode without feedback from DP sensor but rather based on intake carbon di oxide sensor output.

While the above example describes switching between open loop and closed loop operation of the EGR system responsive to load, the inventors herein have further identified that exhaust pulsations cause DP sensor measurement errors when a manifold absolute pressure (MAP) determined based on MAP sensor 182 is above a threshold pressure (such as 26 inches Hg). Therefore, EGR system operation may switch between closed loop and open loop operation responsive to MAP. Accordingly, in one example, during engine operation below the threshold load and/or when MAP is below the threshold pressure, the EGR system may be operated in the closed loop mode; and during engine operation above the threshold load and/or when MAP is above the threshold pressure, the EGR system may be operated in the open loop mode.

Thus, by switching between open loop and closed loop mode of operation of the EGR system, the effect of exhaust pulsation on EGR flow estimation may be reduced. Therefore, more accurate EGR flow estimations may be obtained, leading to more accurate spark advance scheduling. As a result, spark knock may be reduced, which leads to improved fuel economy and performance.

Further, while the example depicted herein shows a boosted engine system, it must be noted that the switching between open loop and closed loop operation of the EGR system to reduce the effect of exhaust pulsation on EGR flow estimation may be applied in other engine configurations, such as a naturally aspirated engine, without departing from the scope of this disclosure, An example graph depicting engine speed along X-axis and engine load along Y-axis, and indicating regions of open loop and closed loop operation of the EGR system is shown at FIG. 2. Specifically, FIG. 2 shows operation of the EGR system in the open loop mode at loads above threshold 202, and operation of the EGR system in the closed loop mode at loads below the threshold 202. While the example shown in FIG. 2 indicates regions of open loop and closed loop EGR system control in a speed-load map, it must be noted that the EGR system operation may be additionally or alternatively based on MAP as discussed briefly above. For example, the EGR system may be operated in the open loop mode when the engine load is above the threshold load 202 and/or when MAP (determined based on MAP sensor 182, for example) is above a threshold pressure; otherwise the EGR system may be operated in the closed loop mode. Details of operating the EGR system in the open loop mode and the closed loop mode, and switching between the two modes are further described below with respect to FIGS. 3-6.

While the above examples illustrate estimating EGR mass flow during open loop control mode based on the intake carbon dioxide sensor, it will be appreciated that in some examples, an intake oxygen sensor 168 may be utilized for EGR mass flow estimation. In the depicted example, the intake oxygen sensor is positioned downstream of air cooler 154. However, in other embodiments, sensor 168 may be arranged at a juncture of intake passages 146, 148, and 149 and upstream of air cooler 154 or at another location along intake passage 149, such as downstream of throttle 158. Intake oxygen sensor (IAO2) 168 may be any suitable sensor for providing an indication of the oxygen concentration of the intake charge, such as a linear oxygen sensor, intake UEGO (universal or wide-range exhaust gas oxygen) sensor, two-state oxygen sensor, etc. Controller 12 may estimate the percent dilution of the EGR flow based on feedback from intake oxygen sensor 168. In some examples, the controller may then adjust one or more of EGR valve 121, AIS throttle 115, or other actuators to achieve a desired EGR dilution percentage of the intake charge.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Further, while not depicted herein, each of intake passages 142 and 144 can include a mass air flow sensor or alternatively the mass air flow sensor can be located in common duct 140.

Figure 3:
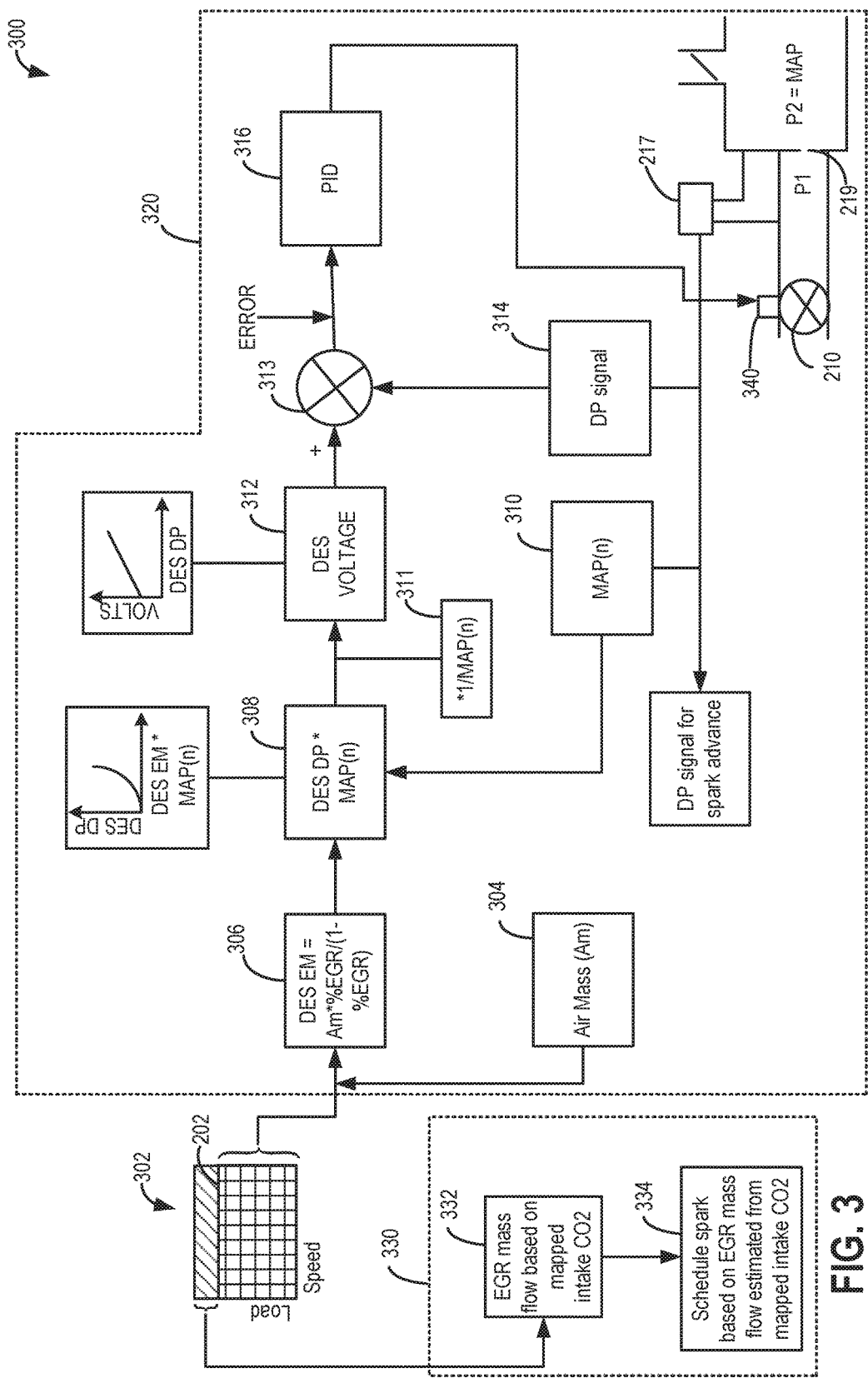
FIG. 3 shows an example control block diagram illustrating example open loop and closed loop EGR control.

Turning to FIG. 3, an example method 300 for closed loop and open loop operation of an EGR system, such as EGR system 206 at FIG. 1, is shown in a block diagram form. In particular, method 300 includes, at loads above a threshold, operating the EGR system in an open loop mode 330, where an EGR flow estimation is based on mapped intake carbon dioxide values; and at loads below the threshold, operating the EGR system in a closed loop mode 320 based on a pressure feedback mechanism for EGR flow control by controlling the EGR valve through a PID controller.

When the engine load is below the threshold, the controller determines a desired EGR percentage of fresh airflow (% EGR) based on engine speed and load. Then, based on the engine air mass (as determined from MAP and speed density calculations, or a mass airflow sensor), at 306, the controller determines a desired EGR mass (DES EM).

Next, at 308, a desired differential pressure (DES DP) may be determined based on the desired EGR mass and the measured MAP from block 310. Block 310 may contain calculated MAP based on pressures detected by a DP sensor, such as sensor 217 at FIG. 1, located at the intake manifold. Next, at 312, a desired DP sensor voltage (DES VOLTAGE) may be calculated based on DES DP. Then, at 313, an error signal (ERROR) may be calculated based on DES VOLTAGE from block 312 and an actual DP sensor voltage (block 314) from the DP sensor. A PID controller, shown at block 316 may then determine an actuation signal based on calculated ERROR signal. The actuation signal may be used to adjust EGR flow by controlling the EGR valve, such as EGR valve 210, through the PID controller. For example, by supplying the actuation signal to a motor actuator, such as actuator 340, a position of the EGR valve may be adjusted to a desired position to provide the desired EGR mass (DES EM) to the engine. The actuation signal may be a duty cycle or a voltage signal, for example.

Further, during closed loop control, an actual EGR flow may be estimated based on the actual DP sensor voltage, and a degree of spark advance may be scheduled based on the actual EGR flow estimated based on the actual DP sensor voltage.

In this way, during closed loop mode, EGR flow may be adjusted based on a pressure feedback mechanism from the DP sensor, which includes controlling the EGR flow through the EGR valve based on an error calculated between desired sensor voltage and actual sensor voltage. In some examples, an error between the actual EGR mass flow determined based on the actual sensor voltage and the desired EGR mass flow (DESEM) may be used to provide feedback control of the EGR valve.

When the engine load is above the threshold, the EGR system may be operated in the open loop control mode, indicated at 330. During the open loop mode, the controller may adjust the EGR valve to a fully open position and as indicated at 332, the actual EGR mass flow may be estimated based on intake carbon dioxide levels measured by a carbon dioxide sensor/analyzer, such as sensor 220 shown at FIG. 1, located within the intake manifold. For example, intake carbon dioxide levels may be mapped with EGR percentage at various speed and load conditions, and stored in a look-up table or a map in a memory of the controller.

Then, based on the measured/estimated intake carbon dioxide levels, an EGR percentage may be calculated. Subsequently, the actual EGR mass flow may be determined as a function of EGR percentage and engine air mass. Then, at 334, based on the actual EGR mass flow, a degree of spark advance may be scheduled.

In one example, in response to a load change from a first load below a threshold to a second load greater than the threshold, transitioning from a closed loop EGR flow control to an open loop EGR flow control, wherein during the transition the EGR valve is ramped open to a fully open position. Further, during the transition, as the EGR valve is ramped open, the EGR valve may be assumed to be in a fully open position and the EGR mass flow may be estimated based on intake carbon dioxide levels as measured by the carbon dioxide sensor located within the intake manifold. For example, a look-up table mapping intake carbon dioxide levels with EGR percentage for open loop control may be stored in a memory of the controller. Upon estimating the intake carbon dioxide levels, the controller may estimate EGR percentage based on the look-up table. The estimated EGR mass flow may then be calculated based on the estimated EGR percentage, and a degree of spark advance may be scheduled based on the estimated EGR mass. In this way, during high load conditions, by estimating EGR flow based on intake carbon dioxide levels and independent of DP sensor output, errors in EGR flow estimation due to exhaust pulsations that affect DP sensor output may be reduced.

Further, in response to a load change from the second load above the threshold to a first load below the threshold, transitioning from open loop EGR flow control to closed loop EGR flow control, wherein during the transition to the closed loop EGR flow control, the EGR valve is ramped from a fully-open position to a more closed position. The actuation signal for adjusting the EGR valve to a more closed position is based on a desired EGR flow that is determined based on current speed and load condition. However, for scheduling spark advance during the transition period, as the EGR valve is ramped to the more closed position, the EGR flow may be determined based on intake carbon dioxide levels and the spark advance may be adjusted based on the intake carbon dioxide levels. Upon completing the transition, the spark advance may be scheduled based on EGR mass flow rate determined based on DP sensor output.

In this way, operation of the EGR system may be switched between an open loop mode and closed loop mode based on load to obtain a more accurate estimation of EGR mass flow.

While the above example illustrates EGR system operation based on load alone, in one example, when the load is below the threshold and/or when a MAP (based on output from a MAP sensor, such as sensor 182 at FIG. 1) is below a threshold pressure, the EGR system may be operated in the closed loop mode; and when the load is above the threshold and/or when the MAP is above the threshold pressure, the EGR system may be operated in the open loop mode. In one example, the threshold pressure may be 26 inches Hg.

Figure 4:
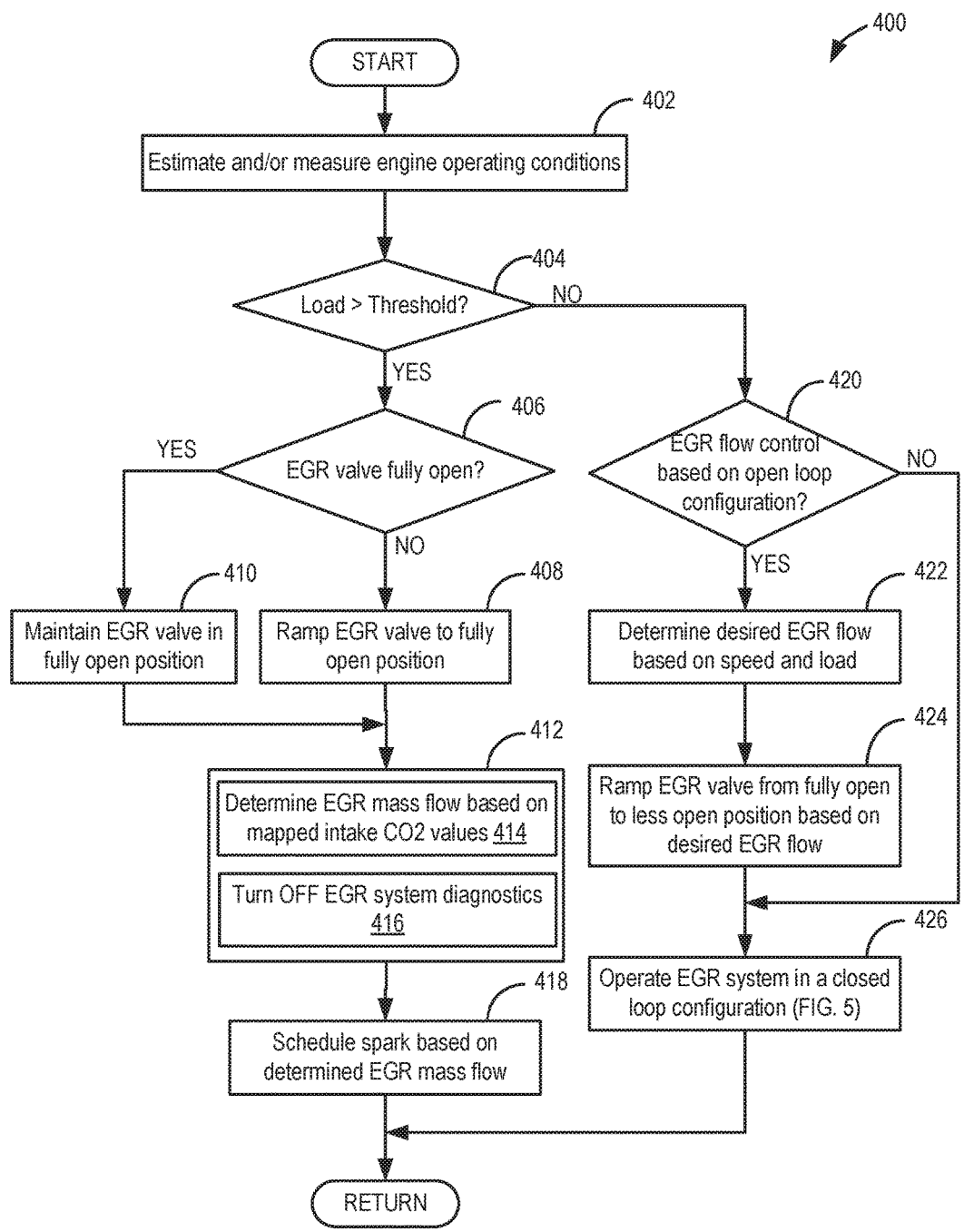
FIG. 4 shows a flowchart illustrating an example method for switching between closed loop and open loop EGR control modes.

Turning to FIG. 4, a flow chart illustrating an example method 400 for operating an EGR system, such as EGR system 206 at FIG. 1, including an EGR valve, such as valve 210 at FIG. 1, in an engine, such as engine 10 at FIG. 1, is shown. Specifically, method 400 illustrates switching between closed loop and open loop operation of the EGR system. While method 400 illustrates closed loop and open loop operation of the EGR system with respect to boosted engine system depicted at FIG. 1, it must be noted that method 400 and the rest of the methods included herein may be applicable to other engine systems, such as a naturally aspirated engine, without departing from the scope of the present disclosure. Further, instructions for carrying out method 400 and the rest of the methods included herein may be executed by a controller, such as controller 12 shown at FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 400 begins at 402. At 402, method 400 includes estimating and/or measuring engine operating conditions. These may include, for example, engine speed and load, driver torque demand (based on accelerator pedal position), boost, MAP, MAF, BP, engine temperature, EGR mass flow, air-fuel ratio, etc. Based on engine operating conditions and torque demand, the vehicle controller may adjust one or more engine actuator settings. The actuator settings adjusted may include, for example, spark timing, EGR valve opening, variable cam timing (VCT), AFR, throttle opening, etc.

Next, at 404, method 400 includes determining if an engine load is greater than a threshold load. In some examples, additionally or alternatively, it may be determined is MAP is greater than a threshold pressure. In one example, the threshold may correspond to a load in the higher load range. For example, the threshold load may be 9 bar brake mean effective pressure (BMEP). In another example, the threshold may be based on a fully opened position of the EGR valve. At the threshold load and above, due to exhaust pulsations in the turbocharged engine, a differential pressure (DP) sensor, such as sensor 217 at FIG. 1, utilized to estimate an EGR mass flow may output a higher voltage leading to a higher EGR flow estimate than actual EGR flow. Thus, when the engine is operating at or above the threshold engine load, the EGR system may be operated in an open loop mode, which does not rely on DP sensor output for EGR flow estimation but rather, the EGR flow is estimated based on intake carbon dioxide sensor, such as sensor 220 at FIG. 1, as discussed below. Further, in the example method 400 discussed herein, the EGR valve may be maintained in a fully open position when operating in the open loop mode.

Accordingly, if the engine load is greater than the threshold, method 400 proceeds to 406. At 406, method 400 includes determining if the EGR valve is fully open. For example, when operating at a first engine load below a threshold, prior to a transition from the first engine load to a second engine load at or above the threshold, the engine may be operating in the closed loop mode for EGR flow control. Consequently, prior to the transition, the EGR valve position may be adjusted based on feedback from the DP sensor to provide a desired EGR flow. Thus, prior to the transition, the EGR valve may not be fully open, and when the load changes from the first load to the second load, the EGR valve may not be fully open. Accordingly, if it is determined that the EGR valve is not fully opened at a time when the load is above the threshold, method 400 proceeds to 408.

At 408, method 400 includes ramping the EGR valve to a fully open position. For example, ramping the EGR valve to the fully open position may include adjusting the EGR valve from a less open position to an intermediate more open position and finally, to a fully open position. The transition from the less open position to the fully open position may include one or more intermediate more open positions. In some examples, such as when an EGR valve opening amount at the less open position is greater than a threshold opening amount, the EGR valve may transition from the less open position to the fully open position without any intermediate more open positions. Further, during the ramping, spark may be scheduled based on EGR flow estimated on mapped intake carbon dioxide values. Upon ramping open the EGR valve to the fully open position, method 400 proceeds to 412.

Retuning to 406, if it is determined that the EGR valve is fully opened, method 400 proceeds to 410. At 410, method 400 includes maintaining the EGR valve at the fully open position. The EGR valve may be maintained at the fully open position as long as the load remains at or greater than the threshold.

While in this example method 400, the EGR valve is ramped open to a fully open position, it must be noted that in some examples, when the load increases above the threshold, the EGR valve may be ramped open to a threshold load position which may not be a fully open position, and maintained at the threshold load position as long as the load remains above the threshold. The threshold load position may be a nearly fully open position, for example.

Next, method 400 proceeds to 412. At 412, method 400 includes estimating EGR mass flow (414) based on mapped intake carbon dioxide values and independent of DP sensor output while maintaining the EGR valve in the fully open position. That is, the EGR system is operated in an open loop mode feed-forward mode, wherein, the EGR valve is maintained in the fully open position until the load decreases below the threshold, and while the EGR valve is the fully open position, the EGR mass flow is estimated based on an output from the carbon dioxide sensor, engine load and engine speed, and mass air flow. For example, the EGR mass flow may be estimated based on a look-up table that maps intake carbon dioxide values to EGR percentage based on engine speed and engine load. Based on estimated EGR percentage from mapped carbon dioxide values, and mass air flow, the EGR mass flow may be estimated. Further, at 414, method 400 includes turning off the EGR system diagnostics (416) during EGR operation in the open loop mode.

Upon estimating the EGR mass flow, method 400 proceeds to 418. At 418, method 400 includes scheduling spark based on the estimated EGR mass. In this way, by switching to open loop feed-forward control of the EGR flow when the engine is operating at or above the load threshold, and scheduling spark based on estimated EGR flow from mapped intake carbon dioxide values rather than DP sensor output, potential spark knock may be reduced. Consequently, unwarranted spark retard may be reduced, which may lead to improved fuel economy and performance.

In one example, switching from closed loop feedback control to open loop feed-forward control of the EGR flow may be performed responsive to MAP reaching or increasing above the threshold pressure. In one example, the threshold pressure may be based on a MAP at which the EGR valve is fully open. In another example, the threshold pressure may be a predetermined value, such as 26 inches Hg.

Returning to 404, if it is determined that the load is not greater than threshold, method 400 proceeds to 420. At 420, method 400 includes determining if EGR flow control is operated in the open loop mode. For example, EGR flow control may be determined to be operating in the open loop mode if the EGR valve is not adjusted responsive to DP sensor output and if EGR flow estimation is based on mapped intake carbon dioxide values and not DP sensor output. In some examples, additionally or alternatively, EGR flow control may be determined to be operating in the open loop mode if an open loop indicator flag is set.

If the answer at 420 is YES, method 400 proceeds to 422. For example, when operating at a third engine load at or above the threshold, prior to a transition from the third engine load to a fourth engine load below the threshold, the engine may be operating in the open loop mode for EGR flow control. Thus, when the load changes from the third load to the fourth load, the EGR flow control may be in the open loop mode. Accordingly, if it is determined that the EGR flow control is operating in the open loop mode when the load is below the threshold, method 400 proceeds to 422. At 422, method 400 includes determining a desired EGR flow based on current engine speed and engine load.

Upon determining the desired EGR flow, method 400 proceeds to 424. At 424, method 400 includes ramping the EGR valve from the fully open position to a desired open position, the desired open position based on the desired EGR flow. For example, the desired open position may be a less open position, and therefore the EGR valve may be ramped close from the fully open position to a less open position. During the ramping, until the desired EGR valve position is reached, the EGR system may continue to operate in the open loop mode. Accordingly, during the ramping, the spark may be scheduled based on EGR estimation from mapped intake carbon dioxide levels.

Next, upon adjusting the EGR valve to the desired position, method 400 proceeds to 426. At 426, the EGR flow control is operated in a closed loop feedback mode. Operating in the closed loop feedback mode includes adjusting the EGR valve based on feedback from the DP sensor to provide an estimation of actual EGR flow and adjusting spark based on actual EGR flow estimation from the DP sensor output. Details of operating the EGR system in a closed loop configuration will be further elaborated with respect to FIG. 5.

Figure 5:
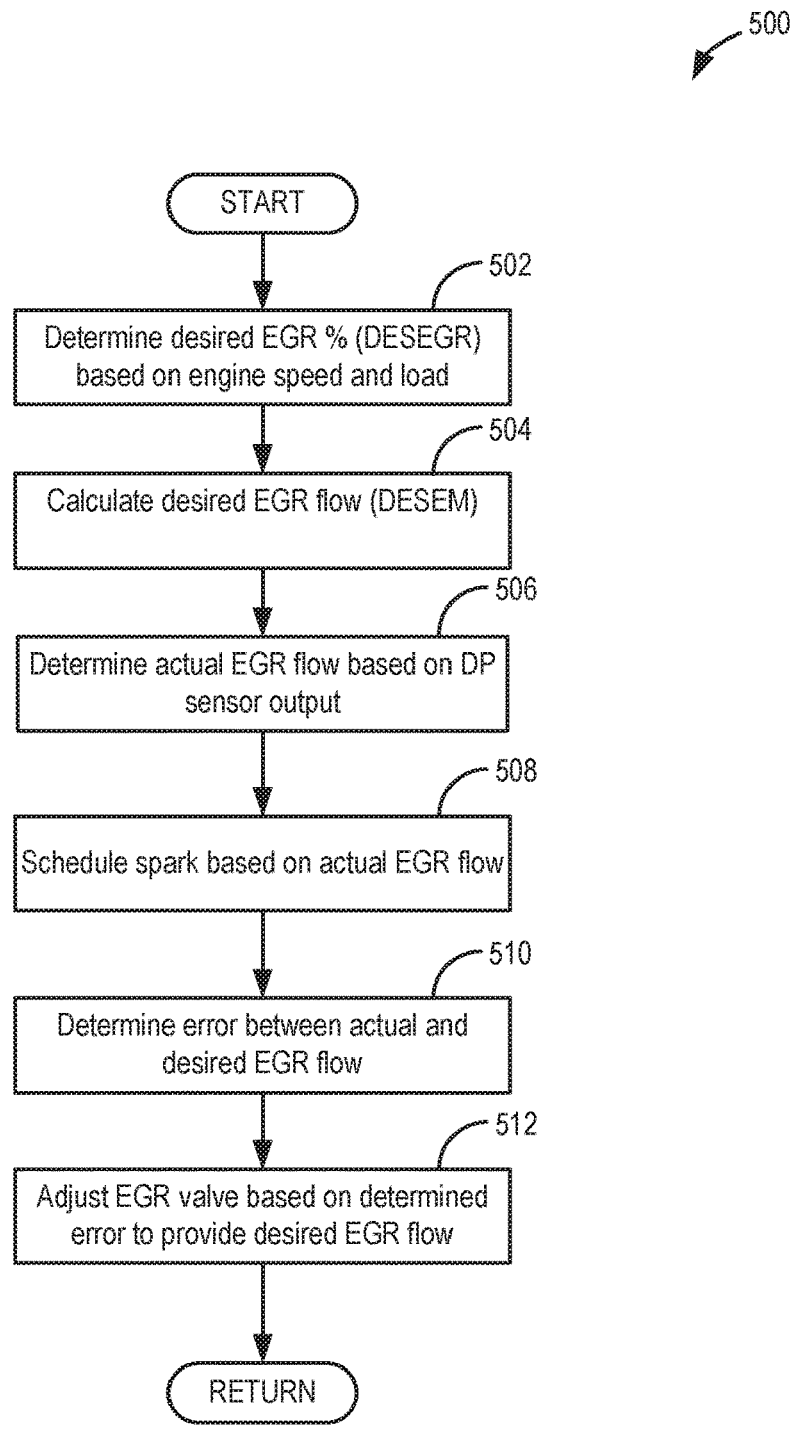
FIG. 5 shows a flowchart illustrating an example method for closed loop EGR control.
Figure 6:
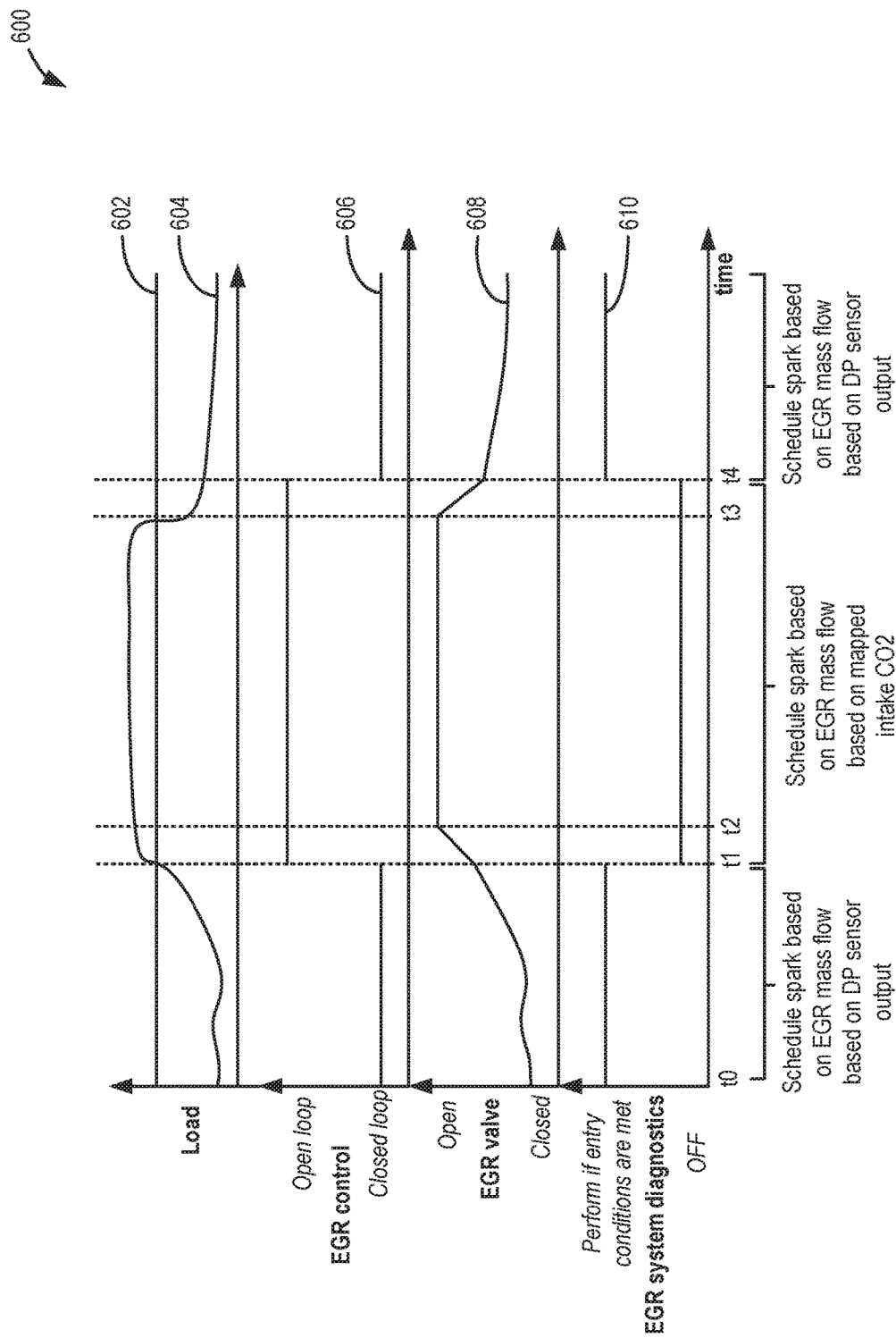
FIG. 6 illustrates an example EGR system operation according to the present disclosure.

Turning to FIG. 5, a flow chart illustrating an example method 500 for operating the EGR system in a closed loop mode is shown.

At 502, method 500 includes determining a desired exhaust gas recirculation percentage (EGR %) based on engine speed and load. Next, at 504, method 500 includes calculating a desired EGR flow (DESEM) based on desired EGR percentage and engine air flow (as determined from MAP and speed density calculations or a mass airflow sensor). The desired EGR flow may be calculated according to the equation:

Desired EGR flow(DESEM)=engine air flow*EGR %/(1-EGR %)

Next, at 506, method 500 includes measuring or estimating an actual EGR flow based on output from a DP sensor, such as sensor 217 at FIG. 1. For example, a differential pressure across an EGR flow control orifice, such as orifice 219 at FIG. 1, is determined from the DP sensor output. Then, actual EGR flow may be determined as a function of differential pressure and MAP, for example based on a square root of the product. Then, spark is scheduled based on the actual EGR flow.

Next, at 510, method 500 includes determining an error between the actual EGR flow and the desired EGR flow. In one example, a proportional-integral-derivative (PID) controller may be utilized to calculate the error. Various other control architectures can be used, such as a proportional controller, or a proportional integral controller, or various other controllers including feedback and feed forward combined control action.

Next, at 512, method 500 includes adjusting an EGR valve, such as valve 210 at FIG. 1, based on the error. For example, an actuation signal based on calculated ERROR signal. The actuation signal may be used to adjust EGR flow by controlling the EGR valve. In particular, the actuation signal may be sent by the controller to a DC motor actuator, such as actuator 340 at FIG. 3, controlling the EGR valve.

In this way, the EGR system may be operated in a closed loop feedback mode during engine operation at loads below the threshold.

Turning to FIG. 6, an example map 600 illustrating example EGR flow control is shown. Specifically, FIG. 6 illustrates switching between open loop control and closed loop control of an EGR system, such as EGR system 206 at FIG. 1, including an EGR valve, such as EGR valve 210 at FIG. 1, responsive to load, according to the present disclosure.

The sequence of FIG. 6 may be provided by executing instructions in the system of FIG. 1 according to the method of FIG. 4 in cooperation with the method of FIG. 5. Vertical markers at times t0-t4 represent times of interest during the sequence.

Specifically, the first plot from the top of FIG. 6 depicts load versus time, and the load increases in the direction of the Y axis arrow. Trace 602 depicts change in load and horizontal line 604 depicts threshold load.

The second plot from the top of FIG. 6 depicts an EGR system control mode. Trace 606 depicts operation of the EGR system in an open loop mode or a closed loop mode.

The third plot from the top of FIG. 6 depicts EGR valve position versus time, and an EGR valve opening increases in the direction of Y axis arrow. Trace 608 depicts actual change in EGR valve opening.

The fourth plot from the top of FIG. 6 depicts a status of EGR system diagnostics. Trace 610 depicts the status of EGR system diagnostics.

At t0, and between t0 and t1, the engine may be operating at a load below the threshold. Accordingly, the EGR system may be operating in a closed loop mode. Consequently, the EGR valve may be adjusted based on feedback from a DP sensor, such as sensor 217 at FIG. 1. That is, as discussed at FIG. 3, during closed loop control, the EGR valve may be adjusted based on an error between an actual DP sensor voltage and a desired DP sensor voltage, where the desired DP sensor voltage is based on a desired EGR flow estimated as a function of engine mass air flow and desired EGR percentage at current speed and load conditions. Further, when the load is below the threshold and the EGR system is operating in the closed loop mode, an actual EGR flow may be calculated based on the actual DP sensor voltage, and the spark may be scheduled based on the actual EGR flow determined. Further, during times at t0 and between t0 and t1, EGR system diagnostics may be performed if entry conditions are met.

At t1, the engine load reaches the threshold. Responsive to the load reaching the threshold, between t1 and t2, the EGR system operation may switch to open loop control mode from the closed loop control mode. Switching to open loop control includes ramping the EGR valve from a less open position to a fully open position. In some examples, switching to open loop control includes ramping the EGR valve to a threshold load position, which may or may not be a fully open position. Switching to open loop control further includes, estimating the actual EGR flow based on intake carbon dioxide levels rather than DP sensor output (e.g., DP sensor voltage). Specifically, during the switching, as the EGR valve is ramped open, EGR flow may be estimated based on a map correlating intake carbon dioxide levels at various engine speed and load with EGR percentage. The intake carbon dioxide levels may be measured based on an output from a carbon dioxide sensor, such as sensor 220 at FIG. 1. Further, during the switching to open loop control mode, as the EGR valve ramps open to the fully open position, spark may be scheduled based on the actual EGR flow estimated based on mapped intake carbon dioxide levels.

At t2, and between t2 and t3, the engine load remains above the threshold. As a result, the EGR system is operated based on the open loop control. Operating the EGR system in the open loop control mode includes maintaining the EGR valve in a fully open position, and estimating the actual EGR flow based on mapped intake carbon dioxide levels. In some examples, the EGR valve may be maintained at the threshold load position. Further, during the open loop control, the spark is scheduled based on the actual EGR flow estimated based on mapped intake carbon dioxide levels.

In this way, at high load conditions (e.g., above 9 bar BMEP), by estimating the actual EGR flow based on intake carbon dioxide levels and not based on DP sensor output, errors in actual EGR flow estimation, which occur due to exhaust pulsations causing the DP sensor to output a higher voltage than actual voltage, may be reduced. Consequently, excess spark advance due to overestimation of the actual EGR flow by DP sensor output may be reduced. As a result, spark knock may be reduced.

At t3, the engine load decreases below the threshold. In response to the engine load decreasing below the threshold, the EGR system operation is switched to closed loop control. Accordingly, at t3, and between t3 and t4, a desired EGR flow is calculated based on engine speed and load conditions, and the EGR valve is adjusted to a first desired position to provide the desired EGR flow. For example, as discussed above with respect to FIG. 3, the first desired position may be based on a desired sensor voltage determined from a desired differential pressure, where the desired differential pressure is determined using a graphical representation from a desired EGR flow. The desired EGR flow may be calculated as a function of a desired EGR percentage and engine air flow, where the desired EGR percentage is based on engine speed and load. Upon calculating the desired sensor voltage, a control signal is sent to an actuator of the EGR valve, to adjust the EGR valve to the first desired position from the fully open position. The control signal may be a voltage level or a duty cycle, for example.

Further, adjusting the EGR valve from the fully open position to the first desired position includes ramping the EGR valve from the fully open position to the desired position. For example, if the first desired position is a more closed position, the EGR valve may be ramped from the fully open position to an intermediate less closed position and then ramped to the more close position. The transition from the fully open position to the more closed (or less open) position may include one or more intermediate less closed (or more open) positions. Further, during ramping from the fully open position to the first desired position, until the first desired position is reached, the actual EGR flow is calculated based on intake carbon dioxide levels and the spark is scheduled based on the actual EGR flow calculated based on intake carbon dioxide levels.

Taken together, during switching from the open loop control mode to the closed loop control mode, the EGR valve is adjusted from the fully open position to the first desired position, where the first desired position is estimated based on the desired differential pressure sensor voltage for the desired EGR flow at current speed and load conditions. Further, during the switching, until the EGR valve is adjusted to the first desired position, the actual EGR flow is estimated from the intake carbon dioxide levels and the spark is scheduled based on the actual EGR flow estimated from intake carbon dioxide levels.

Further, between t1 and t4, when the EGR flow estimation is based on the intake carbon di oxide sensor and the EGR system is operated in an open loop mode, EGR system diagnostics may not be performed (e.g., EGR valve, DP sensor, or EGR cooler diagnostics may not be performed).

Next, at t4, the EGR valve is at the first desired position. Further, at t4 and beyond t4, the engine load remains below the threshold. Accordingly, at t4 and beyond t4, the EGR system is operated in the closed loop control mode and therefore, the actual EGR flow is calculated based on DP sensor output and the spark is scheduled based on the EGR flow calculated based on the DP sensor output. Further, between t4 and beyond, the position of the EGR valve is adjusted based on an error between the actual DP sensor voltage and desired DP sensor voltage, where the desired DP sensor voltage is based on a desired EGR flow at current speed and load conditions. In other words, during closed loop-control, feedback from the DP sensor is utilized for control of EGR valve position.

In this way, by switching operation of the EGR system between an open loop control mode and a closed loop control mode depending on engine load conditions, more accurate EGR flow estimation may be performed. Consequently, more accurate spark scheduling may be performed. As a result, spark knock, due to excess spark advance from excess EGR flow estimation, for example, may be reduced. Therefore, spark retard measures to counteract spark knock may be reduced, leading to improved fuel economy and efficiency.

While the present example illustrates switching between open loop and closed loop operation of the EGR system responsive to load, EGR system operation may switch between closed loop and open loop operation responsive to manifold absolute pressure (MAP). Accordingly, in one example, during engine operation below the threshold load and/or when MAP is below the threshold pressure, the EGR system may be operated in the closed loop mode; and during engine operation above the threshold load and/or when MAP is above the threshold pressure, the EGR system may be operated in the open loop mode. Further, the EGR system operation in closed loop mode and open loop mode and the transition between the two modes as discussed herein may be applied to various engine configurations, such as a boosted engine with high pressure and/or low pressure EGR, and naturally aspirated engine.

In one example, a method for an engine, includes estimating an exhaust gas recirculation (EGR) mass flow based on a differential pressure sensor output when an engine load is below a threshold; estimating the EGR mass flow based on an intake carbon dioxide sensor output when the engine load is above the threshold and independent of the differential pressure sensor output; and adjusting a spark timing based on the estimated EGR mass flow. In a first example of the method, an EGR valve is in a fully open position when the engine load is above the threshold. A second example of the method optionally includes the first example and further includes turning off EGR system diagnostics when the engine load is above the threshold. A third example of the method optionally includes one or more of the first and second examples, and further includes during a first transition from a first load below the threshold to a second load above the threshold, estimating the exhaust gas recirculation mass flow independent of the differential pressure sensor output and based on the intake carbon dioxide sensor output. A fourth example of the method optionally includes one or more of the first through third examples, and further includes wherein, during the transition, an EGR valve is ramped open to a fully open position. A fifth example of the method optionally includes one or more of the first through fourth examples, and further includes during a second transition from the second load above the threshold to the first load below the threshold, estimating the exhaust gas recirculation mass flow independent of the differential pressure sensor output and based on the intake carbon dioxide sensor output. A sixth example of the method optionally includes one or more of the first through fifth examples, and further includes wherein an EGR valve is ramped close from a fully open position to a less open position, the less open position based on a desired EGR flow at the second load. A seventh example of the method optionally includes one or more of the first through sixth examples, and further includes wherein the EGR is a high pressure EGR (HP EGR). An eighth example of the method optionally includes one or more of the first through seventh examples, and further includes wherein the engine is a V-engine; and wherein the HP EGR is on only one bank of the engine.

In another example, a method for an engine includes in response to a manifold absolute pressure increasing above a threshold pressure, ramping an EGR valve to a fully open position; and adjusting spark based on an intake carbon dioxide sensor output. In a first example of the method adjusting spark based on the intake carbon di oxide sensor output includes determining an EGR percentage based on a mapped data, the mapped data correlating EGR percentage with the intake carbon di oxide sensor output at various engine speed and load conditions; determining an EGR flow based on the EGR percentage and engine air mass; and scheduling a degree of spark advance based on the EGR flow. A second example of the method optionally includes the first example and further includes in response to the MAP decreasing below the threshold pressure, ramping the EGR valve from the fully open position to a desired position, the desired position based on engine speed and load; and adjusting spark based on an output from a differential pressure (DP) sensor measuring differential pressure across an orifice in a EGR passage. A third example of the method optionally includes one or more of the first and second examples, and further includes wherein the desired position is a more closed position; and wherein a degree of opening of the EGR valve in the more closed position is based on the engine speed and load. A fourth example of the method optionally includes one or more of the first through third examples, and further includes wherein adjusting spark based on the differential pressure (DP) sensor output comprises: determining an EGR flow based on the differential pressure sensor output; and scheduling a degree of spark advance based on the EGR flow. A fifth example of the method optionally includes one or more of the first through fourth examples, and further includes when the MAP is above the threshold pressure, maintaining the EGR valve in the fully open position; and when the MAP is below the threshold pressure, controlling the EGR valve based on an error between the DP sensor output and a desired sensor output, the desired sensor output based on a desired EGR flow at current engine speed and load.

In another example, a method for an engine includes during a first condition, operating a EGR valve based on an error between a desired DP sensor output and a measured DP sensor output, and adjusting spark timing based on the measured DP sensor output; and during a second condition, operating the EGR valve independent of the DP sensor output, and adjusting spark timing based on an intake carbon di oxide sensor voltage. In a first example of the method the first condition includes an engine load below a threshold, and the second condition includes an engine load above the threshold, the threshold load based on the EGR valve in a fully open position. A second example of the method optionally includes the first example and further includes during a first transition event from the first condition to the second condition, ramping the EGR valve to the fully open position while adjusting spark timing based on an assumed fully open EGR valve position and the intake carbon di oxide sensor voltage; and wherein operating the EGR valve independent of the DP sensor output includes operating the EGR valve in the fully open position. A third example of the method optionally includes one or more of the first and second examples, and further includes during a second transition event from the second condition to the first condition, ramping the EGR valve from a fully open position to a less open position based on a desired EGR while adjusting spark timing based on the assumed fully open EGR valve position and the intake carbon di oxide sensor voltage; and turning off EGR system diagnostics during the second condition and during the first and the second transition events. A fourth example of the method optionally includes one or more of the first through third examples, and further includes wherein the first condition includes a manifold absolute pressure (MAP) below a threshold pressure, and the second condition includes the MAP above the threshold pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
estimating an exhaust gas recirculation (EGR) mass flow based on a differential pressure sensor output when an engine load is below a threshold;
estimating the EGR mass flow based on an intake carbon dioxide sensor output when the engine load is above the threshold and independent of the differential pressure sensor output; and
adjusting a spark timing based on the estimated EGR mass flow.

2. The method of claim 1, wherein an EGR valve is in a fully open position when the engine load is above the threshold.

3. The method of claim 2, further comprising turning off EGR system diagnostics when the engine load is above the threshold.

4. The method of claim 1, further comprising, during a first transition from a first load below the threshold to a second load above the threshold, estimating the EGR mass flow independent of the differential pressure sensor output and based on the intake carbon dioxide sensor output.

5. The method of claim 4, wherein, during the transition, an EGR valve is ramped open to a fully open position.

6. The method of claim 1, further comprising, during a second transition from the second load above the threshold to the first load below the threshold, estimating the EGR mass flow independent of the differential pressure sensor output and based on the intake carbon dioxide sensor output.

7. The method of claim 6, wherein an EGR valve is ramped closed from a fully open position to a less open position, the less open position based on a desired EGR flow at the second load.

8. The method of claim 1, wherein the EGR is a high pressure EGR (HP EGR).

9. The method of claim 8, wherein the engine is a V-engine; and wherein the HP EGR is on only one bank of the engine.

* * * * *